May 16, 1933. H. H. MOORE ET AL 1,909,703
METHOD AND APPARATUS FOR TESTING HOLLOW ARTICLES
Filed March 17, 1928
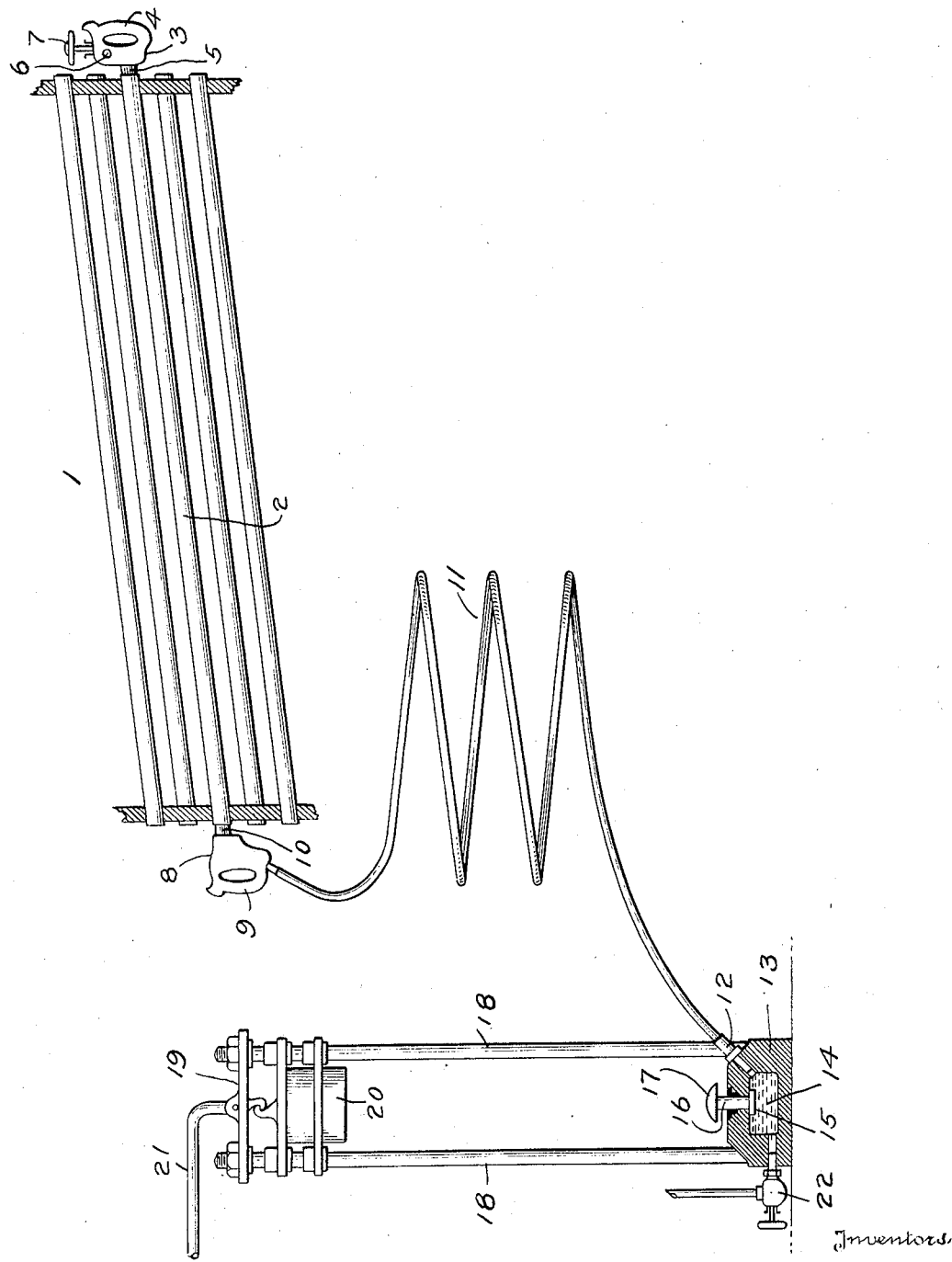
Inventors,
HARRY H. MOORE,
ROBERT A. WEBSTER,
HAROLD H. LITTLE
By
Harold Todd.
Attorney Patented May 16, 1933

1,909,703

UNITED STATES PATENT OFFICE

HARRY H. MOORE, ROBERT A. WEBSTER AND HAROLD H. LITTLE, OF WASHINGTON, DISTRICT OF COLUMBIA

METHOD AND APPARATUS FOR TESTING HOLLOW ARTICLES

Application filed March 17, 1928. Serial No. 262,493.

(GRANTED UNDER THE ACT OF MARCH 3, 1883, AS AMENDED APRIL 30, 1928; 370 O. G. 757)

Our invention relates broadly to methods and apparatus for testing all hollow articles for flaws and weakened portions and more particularly to methods and apparatus for testing pipes of steam condensers, steam boilers and other heat transfer equipment.

The object of our invention is to detect any flaws cracks, fissures, foreign substances, corrosion and all defects and latent weaknesses in new or used hollow articles which would render the same unfit or unsafe for installation or continued use.

A most thorough and efficient test of hollow articles accomplishable in a fraction of the time heretofore required is one of the objects which we accomplish by our invention.

Further objects of our invention will appear more fully hereinafter as the description of the method and apparatus is developed.

Heretofore hollow articles have been tested by filling the article to be tested with a fluid and relatively gradually bringing up the pressure of the fluid to a predetermined point.

This was relatively slow, necessitated cumbersome apparatus and required that the fluid pressure be maintained at its high point for a substantial period of time on the article being tested, and that the high point of such pressure be such as to cause a strain substantially within the elastic limit of the sound material content of the article being tested.

In the course of a protracted series of experiments we have discovered that a most thorough and efficient test may be made of hollow articles in a relatively small fraction of the time heretofore required and with substantially less cumbersome and expensive apparatus.

Our invention of the herein described improved method and apparatus was contributed to by said discovery and those hereinafter stated.

A part of our said discovery was the ascertainment that hollow articles may be most speedily and efficiently tested by filling the hollows of such articles with a fluid and subjecting such fluid to a testing pressure whose maximum may be such that it might cause a strain above the elastic limit of the sound material content of the article being tested and cause the disruption of the sound article. Such strain and disruption is prevented by our control of the time that the article is subjected to such fluid pressure. Such control we have found very beneficial in all respects when it permits such pressure to be applied only for a very brief period of time, and preferably when such pressure is so applied and relieved substantially instantly. Such controlled application and relieving may be likened to rapidly skating over sound ice so thin that it will not withstand the skater's weight when he is proceeding slowly over or standing on such ice. In such ice illustration, unsound ice in or near the skater's path of rapid progress will be disrupted, but the sound ice will not. Likewise in the practice of our method of testing hollow articles, such substantially instantly applied and relieved fluid pressure will not disrupt the sound material of the article being tested thereby due to the control of the time of its application to the article, and will only disrupt any unsound or sub-normal material of such article.

In the ice illustration, as well as in the practice of our method, a force is employed of sufficient magnitude to disrupt sound material of the article when such force is uncontrolled as to the time of its application to such material to so brief a period that no strain results on such material which is above the elastic limit of such material as is sound and fit for protracted use. We have also discovered that such brief period of said application of said force does develop such a strain as is above the elastic limit of such unsound or sub-normal material and disrupts the same without injury or impairment of the sound or normal material.

In the advantageous practice of our improved method, a connected body of fluid is employed with a part thereof filling the hollow of the article being tested, and then very briefly or substantially instantly applying and relieving a substantial or intense pressure preferably to the fluid which is not within the article. For economy and efficiency we prefer that said pressure be applied to the fluid by the dynamic action of a falling weight when stopped, which weight and/or the height from which it falls may be varied for different materials, and that the static force of the weight may continue to exert upon the fluid, until removed, some, though a relatively small, portion of the pressure applied by the stoppage of the falling weight.

It will be observed that the pressure maintained on the fluid by the static force of the weight will cause the fluid to continue to flow through any rupture, occasioned by the dynamic action of the weight, until the weight is removed; and that such flow enables the more convenient inspection of such rupture when the articles being tested are of such nature that their external surfaces are visible while being tested.

For the greatest practical economy and efficiency it is imperative that only wholly sound articles be installed in service, as well as that in definite overhauling periods they may be tested by our method, and that those found presently or latently defective be replaced in order to avoid intermediate expensive shut-down and overhaul periods by thus developing during the definite overhaul periods all defects which would be likely to evidence themselves before the next regular over-haul period and require an intermediate over-haul period.

Such tests of hollow articles are very numerous in considerate production, as well as in over-hauling periods during the service of such articles. The great rapidity and thoroughness of such tests uniformly attainable by the practice of our improved method result in great savings and freedom from accident liability conveniently accomplished at the relatively small production and operation cost of the uncumbersome apparatus required for the practice of our method.

In the prior art hollow articles were tested by controlling the pressure so that it produced a strain on such articles within the elastic limit of their sound material.

By our improved method, and its exemplifying apparatus, hollow articles are tested more rapidly and less expensively by controlling the time that the whole surface of such article is subjected to an intense testing pressure which might produce a strain beyond the elastic limit of the sound material of such article, and which would disrupt such sound material but for the controlling of its application to so brief a period of time that only unsound material of the article being tested is disrupted.

To demonstrate the practical utility and efficiency of our method a related, improved and novel apparatus embodying our invention has been devised by us for the advantageous and economical practice of our method. Such provided apparatus also serves as an illustrative example, to those skilled in this art, of the facility with which, after becoming familiar with our invention, the many forms and kinds of existing apparatus, with or without substantial modification, may be employed in the advantageous practice of our method.

Such apparatus contemplates and provides a convenient, simple, durable and inexpensive portable means for applying the transient hydro-dynamic pressure to the whole surface of the article being tested, and that said pressure be applied by means including the stoppage of a falling body or its substantial equivalent. It also contemplates, in its preferred form, that such falling body strike a hydraulic piston or plunger communicating with or immersable into a fluid adapted to fill the article to be tested, and that the falling body be of the required gravity and/or fall from the required height to apply the requisite transient pressure to the fluid, and that said falling body, after it exerts its dynamic force upon the fluid, shall continue to exert on the fluid its static force which, in the typical instance shown, is conveniently accomplished by said weight remaining on said plunger until removed.

These and other objects and advantages of our invention will become more apparent from the following detailed description and the accompanying drawing illustrating a typical apparatus embodying our invention, which invention will be pointed out in the appended claims.

Reference is to be had to the accompanying drawing forming a part of this specification in which like reference characters indicate corresponding parts throughout the several views and in which is represented our apparatus attached to a steam condenser.

Referring to the drawing numeral 1 represents a steam condenser, the tube 2 of which is to be subjected to test. One end of the tube 2 is closed by means of a closure member 3 that consists of a body portion 4 to which is attached a plug 5 that is secured within the pipe 2 by being threaded therein or wedged therein under pressure. Through the plug 5 and the body portion 4 is a vent or release conduit 6 that is closed by means of a vent valve 7. In the other end of the tube 2 is a closure member 8 that consists of a body portion 9 and a plug 10 that is secured within the end of the pipe 2 in a manner similar to that of closure member 3. Through the plug 10 and the body portion 9 is a conduit that is connected to a flexible connecting tube 11. The other terminal 12 of the flexible connecting tube 11 is threaded into a base 13 and communicates with a chamber 14 therein. Within the base 13 and communicating with the chamber 14 is a plunger 15—16 which extends from the interior of the chamber 14 to the outside of the base 13 and terminates in an impact member or head 17.

Mounted upon the base 13 and extending upwardly therefrom and thereover are a plurality of guide rods 18 that are held at their upper ends in a fixed position relative to each other by a plate member 19. Mounted upon and guided by the guide rods 18 is a weight 20 that is held in an elevated position over the impact member 17 by means of a releasing mechanism 21 which is mounted on the plate 19.

For filling the hydraulic system we have shown a filling valve 22 that is connected to the base 13 and communicates directly with the chamber 14 but it is to be understood that this filling valve may be located at various points of the entire system.

The operation of the device is as follows: After the closure member 6 and 9 are firmly secured to the ends of the tube 2, and weight 20 secured in its elevated position the vent valve 7 is opened. The system is then filled with a fluid introduced through filling valve 22. When the entire system is filled, as indicated by the flow of fluid from the vent conduit 6, the two valves 22 and 7 are closed. The weight 20 is then released and strikes the impact member 17 causing plunger 15—16 to be driven down into the chamber. This operation produces a uniformly high pressure of short duration throughout the entire system. This pressure will rupture the tube if there are any defects in it but due to the short duration of the pressure no added strains of a permanent nature are introduced into the pipe.

We are familiar with devices of the class typified by Letters Patent No. 640,881 and No. 1,572,748 over which our invention is a substantial improvement basically in that said devices were not designed and used to apply a testing pressure of such necessary substantial period of duration that pressures substantially lower than applied by applicants must be used to avoid fracturing sound tubes. Their operation in the manner in which they were designed, and usually practiced but with our higher pressure, would fracture sound tubes.

Notwithstanding our invention employs a substantially higher testing pressure relative to the strength of the tubes to be tested, the essentially fleeting period of its application peculiarly adapts it to greater speed in testing as well as to simple, inexpensive and readily portable apparatus for its practice.

An additional advantage of our invention is that the testing impact is imparted to the liquid which imparts the same simultaneously to the whole surface of the article being tested, instead of such impact being localized at one point or successive points on the surface of the article to be tested, which latter would tend to crystalize the article and/or require more time to make each test.

It will be understood that the above description and accompanying drawings comprehend only the general and preferred embodiment of our invention and that minor detail changes in the construction and arrangement of parts may be made within the scope of the appended claims without sacrificing any of the advantages of our invention.

The invention herein described may be manufactured and used by or for the Government of the United States of America for governmental purposes without the payment of any royalties thereon.

Having thus described our invention what we claim is:

1. The method of testing a hollow article which consists in applying a confined fluid to the whole of one surface of the article to be tested, and subjecting said surface to a definite transient dynamic impact transmitted by said fluid in contact therewith, said impact being of a magnitude which, but for the brevity of its application, is adapted to rupture serviceable material of the article, and which brief impact causes the rupture of only unsound portions of the article.

2. The method of testing a hollow article which consists in completely filling the article with a fluid, subjecting the fluid to a definite pressure which may if maintained be high enough to disrupt even the sound portions of the article, relieving such pressure from said high to a substantially lower pressure in such a short period of time that said high pressure may disrupt only any defective portion of the article, and continuing said lower pressure for a time.

3. The method of testing a hollow article comprising the steps of filling the article with a fluid, applying a definite testing pressure to the fluid which might if maintained produce a strain beyond the elastic limit of the sound material of such article, and controlling the time of such application to a period so brief that only unsound material of such article is disrupted.

4. The method of testing a hollow article with fluid, which consists in completely filling the article with a part of the fluid, confining the other part of the fluid in communication with the first stated part of the fluid, and subjecting the other part of the fluid to a transient substantial impact by a dynamic action imparted at such a high rate as will rupture any unsound portion of the article but not injure sound portions thereof.

5. The method of testing a hollow article which comprises completely filling the article with a fluid, subjecting the fluid to a definite dynamic pressure which may if maintained be high enough to disrupt even a sound portion of the article, relieving such pressure from said high to a substantially lower static pressure in such a short period of time that said high pressure may disrupt only a defective portion of the article, and continuing said lower pressure for a time.

6. The method of testing a hollow article with a fluid, which comprises confining a fluid, completely filling the article with fluid contacting with said confined fluid, and subjecting said confined fluid to a dynamic force of such magnitude and brevity of duration that the time interval of such force acting upon the fluid within the article is less than the time interval of the elastic cycle of the sound material of the article and beyond the time limit of the elastic cycle of any unsound material of the article.

7. The method of testing a hollow metal article in communication with an external enclosed space, comprising filling the article and said space with a liquid, applying and relieving a pressure (sufficient to deform weakened portions) to the liquid in said space and thereby to the liquid within the article for a period of time of the duration of a natural vibration cycle of the sound material of the article being tested.

8. An apparatus for testing a hollow article including in combination, a chamber having a yieldable portion, means for sealing the outlet of the article to be tested, and a fluid connection between said chamber and means; said chamber, connection and the article to be tested being adapted to be filled with a testing medium, and said yieldable portion being adapted to be externally impacted to impart the force of the impact to the testing medium.

9. An apparatus for testing a hollow article including in combination, a rigid chamber having a yieldable portion, separate means for sealing each outlet of the article to be tested, a valve controlled outlet through one of said means; and hollow means adapted to connect, through the other of said means, the interior of said chamber with the hollow of the article to be tested; said chamber, hollow means and the hollow article to be tested being adapted to be filled with a continuous column of testing liquid; and said yieldable portion being adapted to be externally impacted to impart the force of the impact to the testing liquid.

10. An apparatus for testing a hollow article including in combination, a fluid system of which the hollow article is a part and adapted to be filled with a testing fluid, and means for subjecting the fluid to an intense pressure of short duration, said means consisting of a chamber within the fluid system, a plunger extending within the chamber, a pair of vertical guides above the chamber, and a weight within the guides and slidable vertically thereupon and adapted to impact said plunger.

11. In an apparatus for testing a hollow article, the combination of a plurality of closures adapted to close the outlets of the hollow article and be unsupported except by the article whose outlets they close, one of said closures having a vent valve therein and adapted to serve as a terminal of a fluid system, another of said closures having an opening therethrough adapted to serve as a connection to the hollow article, a chamber; a tube joined to said chamber and the closure having the opening; said article, tube and chamber being adapted to be filled with communicating fluid; a plunger extending from a point without to within said chamber and adapted to contact with said fluid content, and an impact receiving portion upon the outer end of said plunger adapted to receive a suddenly imparted and relieved impact.

12. In an apparatus for testing a hollow article, the combination of closure means in separate elements adapted to close the hollow article and be independently portable and unsupported except by the article, said means being provided with a vent valve and a connection to the hollow article, a chamber, a flexible tube joined to said connection and said chamber; said article, tube and chamber being adapted to be filled with communicating fluid, a plunger extending from a point without to within said chamber and adapted to contact with said fluid content, an impact receiving head comprising the outer end of the plunger, and means for suddenly imparting and relieving an impact upon said head, said chamber being supported independently of said closure means, and said separate elements being connected only by the article that they close.

13. In an apparatus for testing a hollow article, the combination of a plurality of closures for the outlets of the hollow article, one of said closures having a vent valve therein, another of said closures having an opening therein serving as a connection to the interior of the hollow article, a chamber, a flexible tube joined to said connecting closure and to said chamber; the article, the tube and the chamber thus connected being adapted to be filled with communicating testing fluid; a plunger communicating with the interior of the chamber and adapted to contact with said fluid, an impact portion upon the outer end of the plunger exposed without the chamber, upright guides supported by the base of said chamber at opposite sides of said plunger, a weight slidable along said guides, and means at the top of said guides for releasably holding the weight in a raised position, the weight when released being adapted to act upon said impact receiving portion of said plunger.

14. In an apparatus for testing a hollow article, the combination of means having a part thereof adapted to be removably attached to and close the outlet of the article to be tested and another part of said means having a yieldable portion, valve controlled means leading from a source of testing liquid supply and to said means for filling the article to be tested with testing liquid which is adapted to contact with a part of said yieldable portion, said first named means being provided with a vent valve for releasing all air from the space being filled with the testing liquid, said yieldable portion being adapted to be impacted by a movable solid to impart the force of said impact to the testing liquid and to the surface of the article to be tested which is in contact with said testing liquid.

15. In an apparatus for testing tubes, the combination of means having two parts thereof adapted to be removably attached to and close the opposite ends of the tube to be tested and another part of said means having a yieldable portion, valve controlled means leading from a source of testing liquid supply and through one of said parts for filling the tube to be tested with testing liquid which is adapted to contact with a part of said yieldable portion, the one of said two parts being provided with a vent valve for releasing all air from the space being filled with the testing liquid, and solid means having a definite path of travel for impacting said yieldable portion to impart the force of said impact to the testing liquid and to the surface of the tube to be tested which is in contact with said testing liquid.

HARRY HILL MOORE.
ROBERT ALDEN WEBSTER.
HAROLD HARRISON LITTLE.